(No Model.)
F. H. SMITH.
CAR WHEEL.
No. 294,090. Patented Feb. 26, 1884.
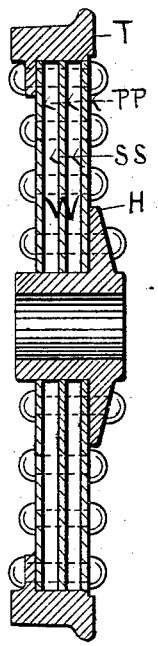
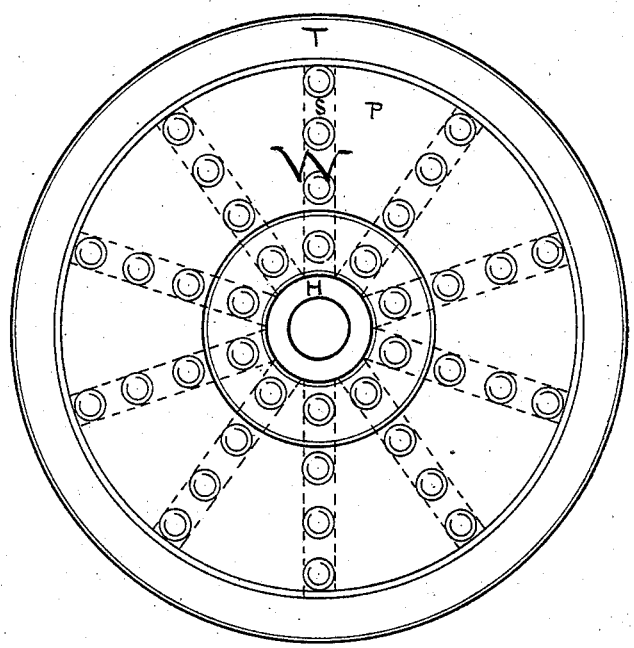
WITNESSES
INVENTOR
Frederick H. Smith

UNITED STATES PATENT OFFICE.

FREDERICK H. SMITH, OF BALTIMORE, MARYLAND.

CAR-WHEEL.

SPECIFICATION forming part of Letters Patent No. 294,090, dated February 26, 1884.

Application filed August 8, 1883. (No model.)

*To all whom it may concern:*

Be it known that I, FREDERICK H. SMITH, a citizen of the United States, residing at Baltimore city, in the State of Maryland, have invented certain new and useful Improvements in the Construction of Car-Wheels, the nature of which is fully set forth and explained in the following specification and in the accompanying drawings.

Figure 1 in the accompanying drawings is a rear view of a car-wheel constructed in accordance with my invention, and Fig. 2 is a cross-section of the same on the line A Z.

P P are annular web-plates, and S S are radial spoke-bars bolted or riveted in between the web-plates, and these annular web-plates and radial spoke-bars, thus riveted or bolted and combined into one practically solid piece, constitute a preferable form of my improved annular web W. The outer edge of this annular web bears against the intrados of the tire T, and the web is bolted or riveted to the rib of the tire, as shown, while the inner edge of the annular web bears against the extrados of the hub H, and the web is bolted or riveted to the flange of the hub, as shown.

The drawings show my improved annular web as adapted for use in the large-sized forty-two-inch wheel, which is now coming into use for sleeping and parlor cars and other high-class service, because of its greater smoothness of running, ease of draft, and disproportionately longer life, and to which size the ordinary chilled-tread cast-iron-plate wheel is not adaptable, owing to danger from increased cooling strains.

The ribbed steel tire and the flanged cast-iron hub (shown on the drawings as bearing against and being riveted to the outer and the inner edges, respectively, of my improved annular web) are substantially the same tire and hub and methods of attachment to the web that have well proved their reliability by long and varied service in Europe and America, in wheels in which the annular web is composed of wood or paper or cast metal, or open spokes of wrought-iron.

In order that car-wheel experts may compare my improved wheel with others having annular webs of wood or paper or other materials, I will specify that my forty-two-inch wheel shown on drawings has three annular web-plates of rolled iron three-eighths inch thick and twenty rolled-iron spoke-bars two by one inch section, and forty rivets one inch diameter. The hub is of best car-wheel cast-iron, one and one-half inch thick in the barrel and two inches thick in the flange, tapering down to one inch at the edge of an eighteen-inch circle. The tire is steel and of the ordinary ribbed section rolled by several American mills. The rivet-holes in the plates and spokes can be punched and reamed, those in the hub can be cored and reamed, and those in the tire-rib can be drilled. The contact-surfaces between the web and the tire and between the web and the hub must be machine-finished to full bearings. The rivets should be heated most at the points, and but slightly at the other end, so as to reduce the cooling strains due to contraction. The tire may be shrunk or pressed on, and the hub should be forced into the web under heavy pressure, so as to counteract the bursting strain caused by pressing the hub to its place on the axle.

A main advantage of my annular web is that it admits of very heavy pressure upon either its outer or inner edges, and it thus matches the bursting strains from the axle, and leaves the hub free from initial strains either way when it goes out on the road.

Another advantage in my improved annular web is that it grips and binds its hub much more rigidly, and thus secures it very much more effectually against either breaking or loosening than can be done by those webs which are made of wood or paper or other soft or brittle materials.

A still further merit is that my improved web admits of changing, removing, or renewing of both tire and hub with extreme facility; and, furthermore, my improvement is really a spoke-wheel riveted up inside of a plate-wheel, and the good points of both wheel systems are thus combined in my one improved wheel.

The plates in my improved annular web may be flat and parallel, as shown; or they may be convexed or concaved, and they may be two or more in number; but the three-plate wheel is about right for present tires, as the central plate is in proper position to effectively support the tire under the main tread, and thus secure it against longitudinal splitting when it is worn down thin.

The spokes in my wheel may be of flat bars, as shown; or they may be of many other shapes—such as beams, or channels, or angles—and a very light, strong, and elastic wheel contains two plates, inclosing tubular spokes, made of rolled or welded gas-pipe.

The spokes may be placed radial to the center, as shown; or they may be tangential to the hub, or be inclined, or spiral, or bent, or otherwise, with a view to giving increased elasticity to the wheel, or for other reasons. They may be tapered to suit concave or convex web-plates, and the interior of the web may be packed with wood or paper or other suitable substances.

The tire may be ribbed, as shown, or otherwise; or it may be grooved or shouldered, or flat or recessed; and it may be attached as shown, or otherwise; or it may be shrunk or pressed on, or keyed.

The hub may be shaped and attached as shown, or in many other ways, and the plates or spokes, or both, may bear against any or different portions of the tire or hub, in the same or different wheels; but all such modifications are minor, and are contemplated in my invention, so long as they are used in connection with my improved separate annular web constructed of spokes and annular plates bolted or riveted to each other in accordance with the language of my claim.

I am aware of United States Patent No. 6,999, but disclaim interference therewith, as the plates and spokes of the wheel therein described and shown are not bolted or riveted or otherwise fastened to each other, and therefore do not strengthen each other, or work together as one combined annular web, whereas the plates and spokes of my improvement are so combined into one annular web by bolting or riveting through and through that they stiffen and brace each other against all contingencies.

I am aware of United States Patent No. 266,061, but disclaim interference therewith, as the spokes and plates constituting the annular web of the wheel therein described extend inwardly to a direct bearing upon the axle, and they also are not separate from the hub, but form component parts thereof, whereas the spokes and plates constituting the annular web of my present improved wheel do not extend inwardly to a direct bearing upon the axle, but bear against the hub, and they are separate from the hub, and do not form component parts thereof.

I claim—

A car-wheel in which there is interposed between a peripheral tire and a central hub a separate annular web constructed of wrought-iron or steel annular plates strengthened, braced, and stiffened by wrought-iron or steel spokes placed in between and in contact with the annular plates, and attached thereto and combined therewith by bolts or rivets passing through the annular plates and spokes, as shown.

FREDERICK H. SMITH.

Witnesses:
W. S. WILKINSON,
JAMES E. WILKINSON.